United States Patent
Hwang et al.

(10) Patent No.: US 9,369,743 B2
(45) Date of Patent: Jun. 14, 2016

(54) METHOD AND APPARATUS FOR TRANSMITTING AND RECEIVING BROADCASTING DATA BY USING MMT IN DIGITAL BROADCASTING SYSTEM

(71) Applicant: Samsung Electronics Co., Ltd., Suwon-si, Gyeonggi-do (KR)

(72) Inventors: Sung-Oh Hwang, Yongin-si (KR); Sung-Ryeul Rhyu, Yongin-si (KR); Kyung-Mo Park, Seoul (KR); Young-Kwon Lim, Goyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 14/258,446

(22) Filed: Apr. 22, 2014

(65) Prior Publication Data

US 2014/0313916 A1    Oct. 23, 2014

(30) Foreign Application Priority Data

Apr. 22, 2013  (KR) .................. 10-2013-0044471

(51) Int. Cl.
*H04N 21/236* (2011.01)
*H04N 21/2381* (2011.01)
*H04N 21/643* (2011.01)
*H04H 60/73* (2008.01)

(52) U.S. Cl.
CPC ......... *H04N 21/236* (2013.01); *H04N 21/2381* (2013.01); *H04N 21/643* (2013.01); *H04H 60/73* (2013.01)

(58) Field of Classification Search
None
See application file for complete search history.

(56) References Cited

U.S. PATENT DOCUMENTS

| 2008/0225892 A1* | 9/2008 | Vare ................. H04L 1/0083 370/473 |
| 2010/0002696 A1 | 1/2010 | Vare et al. |
| 2011/0051745 A1* | 3/2011 | Lee .................. H04N 21/238 370/474 |
| 2011/0255558 A1 | 10/2011 | Hwang et al. |
| 2012/0320911 A1 | 12/2012 | Hwang et al. |
| 2013/0086213 A1 | 4/2013 | Rhyu et al. |
| 2013/0094563 A1 | 4/2013 | Bae |
| 2013/0097627 A1* | 4/2013 | Hwang ............... H04H 60/73 725/25 |

FOREIGN PATENT DOCUMENTS

KR    10-2012-0138603 A    12/2012

OTHER PUBLICATIONS

ETSI TS 102 606 v1.1.1 (Oct. 2007) Digital Video Broadcasting (DVB); Generic Stream Encapsulation (GSE) Protocol.*
ETSI TS 102 771 v1.2.1 (May 2011) Digital Video Broadcasting (DVB); Generic Stream Encapsulation (GSE) implementation guidelines.*

* cited by examiner

*Primary Examiner* — Gary Mui
(74) *Attorney, Agent, or Firm* — Jefferson IP Law, LLP (57) ABSTRACT

A method and an apparatus for transmitting and receiving broadcasting data in a digital broadcasting system are provided. The method includes analyzing a media transmission characteristic of a moving picture experts group (MPEG) media transport (MMT) package, setting digital video broadcasting generic stream encapsulation (DVB GSE) based on the analyzed media transmission characteristic, and transmitting an MMT packet comprising the broadcasting data constituting the MMT package using the DVB GSE.

5 Claims, 10 Drawing Sheets

METHOD AND APPARATUS FOR TRANSMITTING AND RECEIVING BROADCASTING DATA BY USING MMT IN DIGITAL BROADCASTING SYSTEM

CROSS-REFERENCE TO RELATED APPLICATION(S)

This application claims the benefit under 35 U.S.C. §119 (a) of a Korean patent application filed on Apr. 22, 2013 in the Korean Intellectual Property Office and assigned Serial number 10-2013-0044471, the entire disclosure of which is hereby incorporated by reference.

TECHNICAL FIELD

The present disclosure relates to a method and an apparatus for transmitting and receiving broadcasting data in a digital broadcasting system. More particularly, the present disclosure relates to an apparatus and a method for transmitting and receiving broadcasting data by using Moving Picture Experts Group (MPEG) Media Transport (MMT) in a digital broadcasting system.

BACKGROUND

With the development of broadcasting technologies, broadcasting systems providing an audio/video service and a limited data service using the MPEG2 transport stream were developed by MPEG in the 1990s. The MPEG2 transport stream efficiently provides a real time audio/video service and synchronization information of the audio/video. However, utilization of the MPEG2 transport stream is limited due to a fixed frame size of 188 bites, restricted multiplexing, and complex data broadcasting. Thus MPEG started to develop a next-generation transport system in 2008.

The next generation transport system is called MMT, and may provide a function for an audio/video multimedia service, a data broadcasting service, and a multiscreen service through a broadcasting network or an Internet Protocol (IP) network. Further, MMT is suggested to be used in a broadcasting network, an IP network, or a predetermined transmission network. Accordingly, there is a need for MMT application to a digital broadcasting system such as a Digital Video Broadcasting (DVB) system.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for transmitting and receiving broadcasting data using moving picture experts group (MPEG) media transport (MMT) in a digital broadcasting system.

Another aspect of the present disclosure is to provide an apparatus and a method for providing additional functions when necessary when broadcasting data is transmitted and received using MMT in a digital video broadcasting (DVB) system.

In accordance with an aspect of the present disclosure, a method of transmitting broadcasting data in a digital broadcasting system is provided. The method includes analyzing a media transmission characteristic of a MMT package, setting DVB generic stream encapsulation (DVB GSE) based on the analyzed media transmission characteristic, and transmitting an MMT packet comprising the broadcasting data constituting the MMT package using DVB GSE.

In accordance with another aspect of the present disclosure, an apparatus for transmitting broadcasting data in a digital broadcasting system is provided. The method includes a transmitter configured to transmit the broadcasting data through a network and a controller configured to analyze a media transmission characteristic of an MMT package, to set DVB GSE based on the analyzed media transmission characteristic, and to transmit an MMT packet comprising the broadcasting data constituting the MMT package using DVB GSE.

In accordance with yet another aspect of the present disclosure, a method of receiving broadcasting data in a digital broadcasting system is provided. The method includes receiving a GSE packet received using DVB GSE, reconfiguring the MMT packet from the GSE packet, and extracting the broadcasting data from the MMT packet and reconfiguring an MMT package.

In accordance with still another aspect of the present disclosure, an apparatus for receiving broadcasting data in a digital broadcasting system is provided. The apparatus includes a receiver configured to receive the broadcasting data through a network and a controller configured to control an operation of receiving a GSE packet received using DVB GSE, to reconfigure the MMT packet from the GSE packet, and to extract the broadcasting data from the MMT packet and reconfigure an MMT package.

The present disclosure can provide additional functions when a broadcasting service is transmitted and received using MMT in a DVB system.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of the present disclosure, a representative embodiment of the present disclosure will be suggested. The representative embodiment will be described based on Moving Picture Experts Group (MPEG) Media Transport (MMT) technology in a Digital Video Broadcasting (DVB)-Generic Stream Encapsulation (GSE) and MPEG related technologies of a DVB broadcasting technology which are standards for digital broadcasting, and it will be appreciated that the representative embodiment does not limit the scope of the present disclosure.

Figure 1:
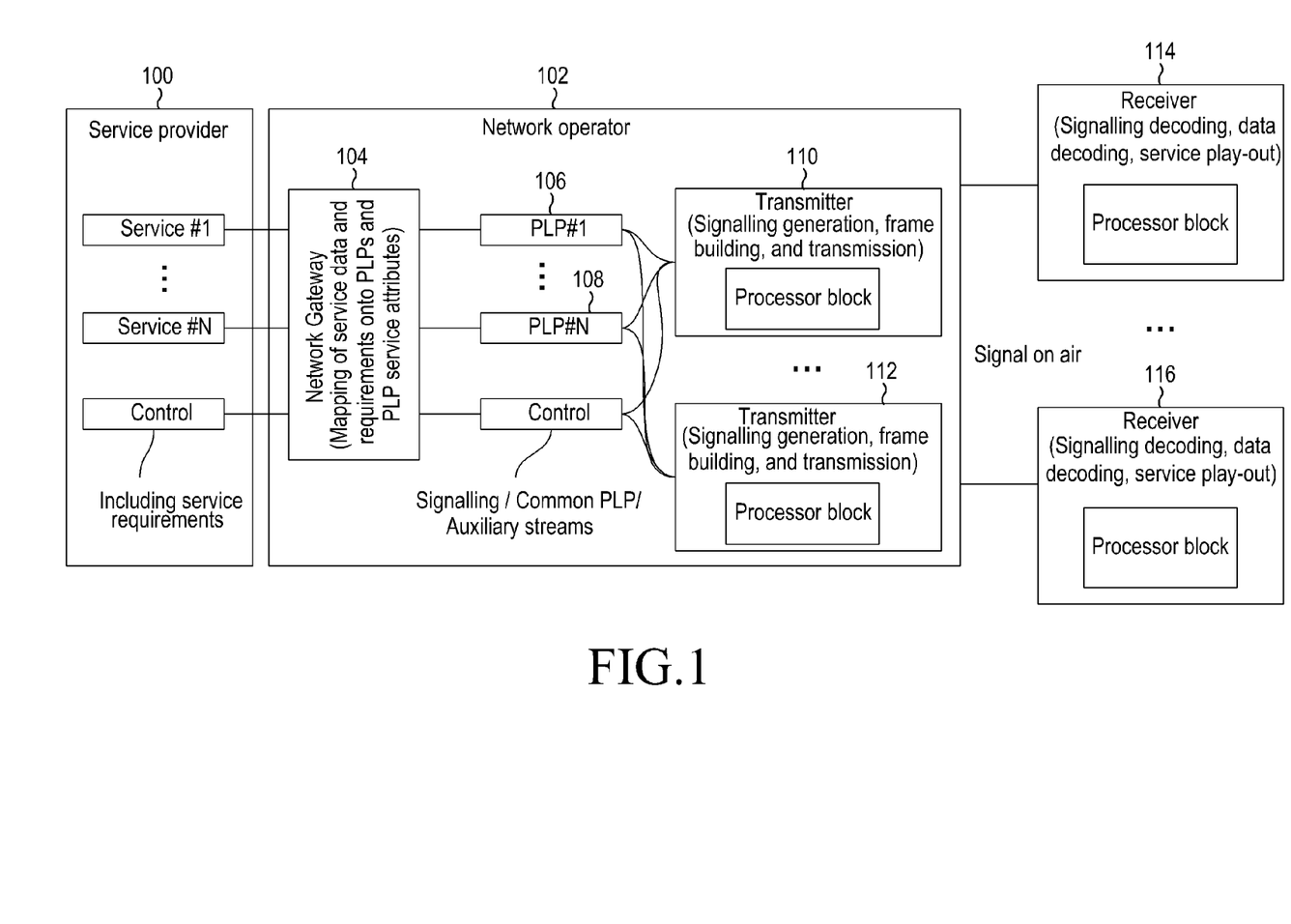
FIG. 1 is a view showing an example of a Digital Video Broadcasting (DVB) system according to an embodiment of the present disclosure.

FIG. 1 is a view showing an example of a DVB system according to an embodiment of the present disclosure.

Referring to FIG. 1, the DVB system includes a service provider 100, a network operator 102, and receivers 114 and 116.

The service provider 100 is a subject for providing a service, and provides a broadcasting service and information necessary for providing the broadcasting service to the network operator 102. The network operator 102 is a subject for operating a broadcasting network, and corresponds to broadcasting services received from the service provider 100 through a network gateway 104, for example, service #1 to service #N to Physical Link Pipe (PLP)#1 106 to PLP#N 108.

The PLP is a logic channel used in a physical layer for collecting and transmitting broadcasting services having the same physical transmission characteristics. The network operator 102 provides information necessary for receiving the broadcasting service to the receivers 114 and 116. Here, the information necessary for receiving the broadcasting service is determined as a sum of information necessary for receiving broadcasting services (that is, broadcasting data) transmitted through the PLP and information necessary for receiving a broadcasting service provided by the service provider 100.

After being transmitted to transmitters 110 and 112, the broadcasting services and information corresponding to PLP#1 106 and PLP#N are changed to broadcasting physical signals and transmitted to the receivers 114 and 116 of the corresponding areas. The receivers receive control information and broadcasting services and provide a broadcasting service to the user.

Figure 2:
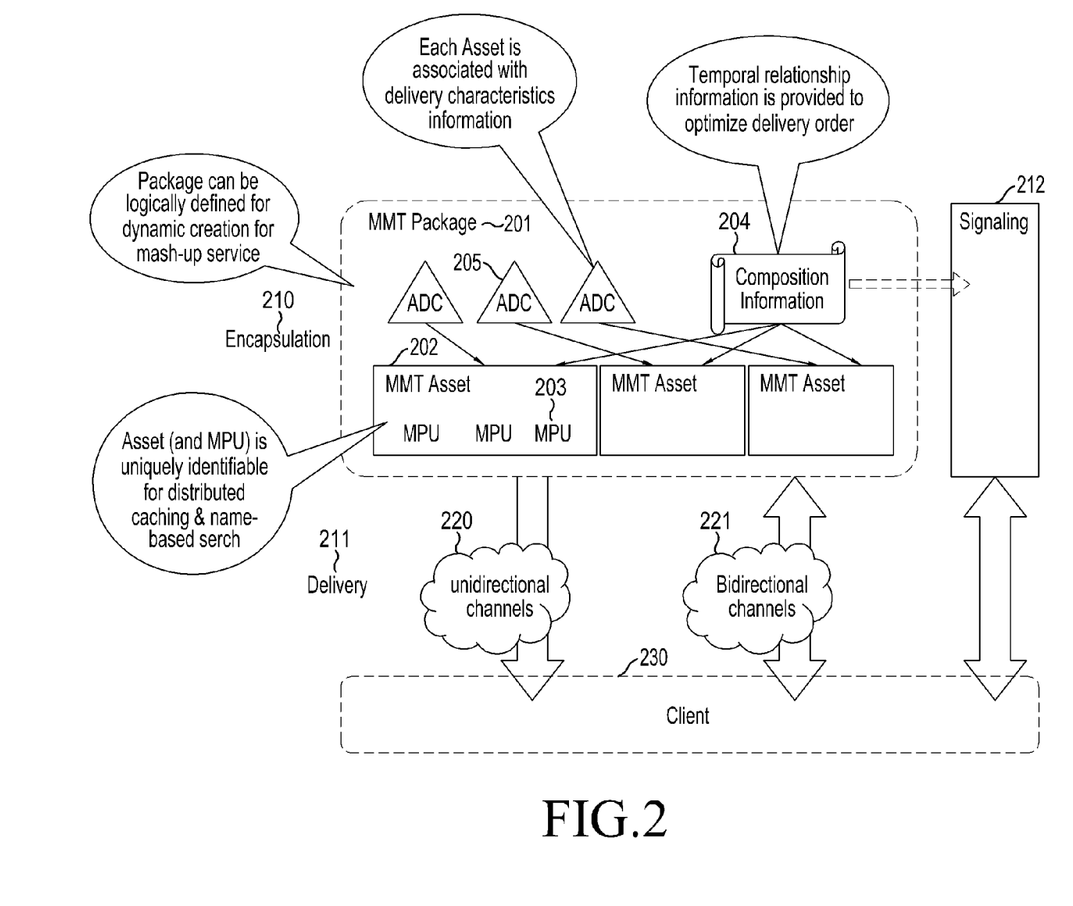
FIG. 2 is a concept view of Moving Picture Experts Group (MPEG) Media Transport (MMT) according to an embodiment of the present disclosure.

FIG. 2 is a concept view of MMT according to an embodiment of the present disclosure.

MMT will be briefly described prior to a description of FIG. 2. MMT is a standard technology for efficiently transmitting complex contents having multimedia elements, such as videos, sounds, and applications, through heterogeneous networks including a broadcasting network and a communication network. The basic concept of MMT is to overcome a limit of an MPEG2 transmission stream used to transmit multimedia contents in a broadcasting network according to the related art, that is, an inefficient transmission due to unilateral communication and a fixed frame size, a transmission protocol specified separately for sounds and videos, or an overhead unnecessary for transmission using a transmission protocol. Further, MMT may be understood as a transmission technology which is more friendly with an Internet protocol which is becoming a basic technology for multimedia transmission networks.

Referring to FIG. 2, MMT defines a service or contents by using a logic object called an MMT package 201. The MMT package 201 includes one or a plurality of MMT assets 202, Composition Information (CI) 204, and one or a plurality of Asset Delivery Characteristics (ADCs) 205.

The MMT asset 202 is a media object having a single property, for example, a specific media object such as a video, a sound, an application, or a file. The CI 204 includes consumption information on the plurality of MMT assets 202, and examples of the consumption information may include information of the MMT assets 202 and configuration information for spatio-temporally disposing the MMT assets on a screen. The ADC 205 provides media characteristics of the MMT assets 202, that is, information such as the type of media, transmission speed, reproduction speed, and a recommended amount of received buffers.

The MMT asset 202 includes a plurality of MMT Processing Units (MPUs) 203, where an MPU 203 is a minimum unit of media which may be independently consumed by MMT. The MPU 203 includes a plurality of MMT Fragmented Units (MFUs), where an MFU is a minimum data unit processed by the MMT. For example, the MFU may be, for example, one slice of a video frame or an Access Unit (AU).

The MMT package 201 is transmitted to a client 230 (for example, a user terminal or a receiver) through a unidirectional channel 220 or a bidirectional channel 221. The client 230 displays the MMT package 201 to the user according to information provided from configuration information 204.

The MMT includes three technical areas for executing the above-described operation, that is, an Encapsulation Layer (Layer E) 210, a Delivery Layer (Layer D) 211, and a Signaling Layer (Layer S) 212. Layer E 210 is responsible for generation of complex contents, Layer D 211 is responsible for efficient transmission of the generated contents (including use of heterogeneous networks), and Layer S 212 provides information on consumption and transmission of the complex contents.

Layer E 210 includes an E.3 layer for receiving an input from a multimedia source and generating a fragment (that is, MFU) which is the most basic unit, an E.2 layer for generating an access unit of the MMT by using the fragment, and an E.1 layer for generating a format for creation, storage, and transmission of the complex contents. Layer D 211 includes a D.1 layer which is responsible for an application program performing a function similar to that of a Real-time Transport Protocol (RTP) or Hyper Text Transfer Protocol (HTTP), a D.2 layer which is responsible for a network layer protocol performing a function similar to those of a User Datagram Protocol (UDP) and a Transmission Control Protocol (TCP), and a D.3 layer for an operation of optimizing mutual layers.

Layer S 212 includes an S.1 layer for providing information related to creation and consumption of complex contents, and an S.2 layer for providing information related to transmission of the complex contents.

Figure 3:
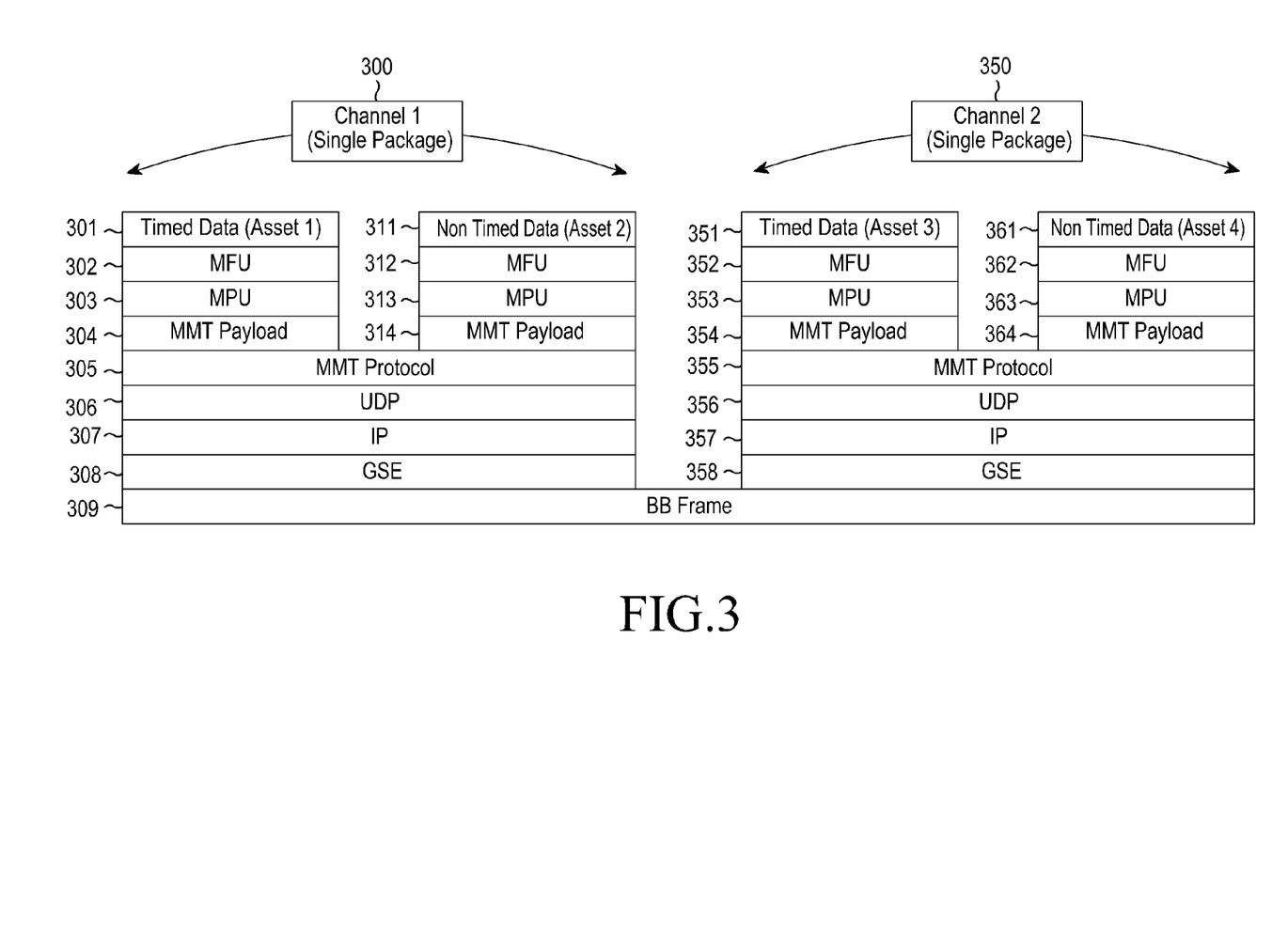
FIG. 3 is a view showing a protocol stack of a digital broadcasting system using MMT according to an embodiment of the present disclosure.

FIG. 3 is a view showing a protocol stack of a digital broadcasting system using MMT according to an embodiment of the present disclosure.

In FIG. 3, the digital broadcasting system will be described while using a DVB system as an example.

Referring to FIG. 3, it is assumed that the MMT package described with reference to FIG. 2 is transmitted through Channel 1 300 and Channel 2 350. It is assumed that Channel 1 300 includes timed data 301, for example, Asset 1 which is video data, and non-timed data 311 for providing additional information in a broadcasting service which transmits the video data, for example, Asset 2. Although audio data which is an element necessary for a broadcasting service are not shown in FIG. 3, it is assumed that the audio data may be transmitted through the same process as that of the video data 301.

Although video data and additional data are exemplified as the configuration of Channel 1 300 for convenience of description here, the next-generation broadcasting service may configure one channel with independent applications such as video data, audio data, captions, applications, webpages, additional data, and games. The configuration of the channel may be modified according to a method of configuring a package in MMT.

The timed data 301 is created by the MFU 302, and the plurality of MFUs correspond to one MPU 303. Then, if the amount of data of the MFU 302 is large, the MPU 303 may be configured by the MFU 302. The MPU 303 is loaded on an MMT payload 304 for transmission. The size of the MMT payload 304 may be determined to be a size which is most efficiently used in a network through which the MMT payload 304 is to be transmitted. As an example, one MPU may correspond to one MMT payload, a plurality of MPUs may correspond to one MMT payload, or one MPU may correspond to a plurality of MMT payloads.

It is assumed that the MMT payload 304 is transmitted through a packet of the MMT protocol 305 and the MMT protocol 305 may transmit one MMT payload. The packet of the MMT protocol is configured into a DVB GSE packet 308 via the UDP layer 306 and the IP layer 307, and is configured into a Base Band (BB) frame 309 of a physical layer. The BB frame 309 is transmitted to a receiver (a terminal of a user) via a physical layer processing step defined by the DVB.

In FIG. 3, the non-timed data 311 of Channel 1 300 may be any service such as additional information or a webpage, and becomes an MMT payload 314 via the MFU 312 and the MPU 313. The MMT payload 314 is configured into a packet of the MMT protocol 305, is configured into a DVB GSE packet 308 via the UDP layer 306/the IP layer 307, and is transmitted to the BB frame 309 of a physical layer. When the MMT payload 304 and the MMT payload 314 are transmitted using the MMT protocol 305, the timed data 301 and the non-timed data 311 may be transmitted through one protocol, and may be transmitted through suitable time-division transmission according to the transmission characteristics required by the timed data 301 and the non-timed data 311.

The processing step of Channel 2 350 denoted by reference numerals 351 to 358 and 361 to 364 is the same as the processing step of Channel 1 300 denoted by reference numerals 301 to 309 and 311 to 314, respectively, and a detailed description thereof will be omitted.

The item which should be considered in multiplexing broadcasting channels as in the first embodiment is to minimize a channel acquisition time of a receiver or a terminal.

In a Transmission Control Protocol (TCP)/IP network model, the MMT protocol is an application level protocol, and Channel 1 301 and Channel 2 350 may be multiplexed and transmitted through various methods. That is, channel multiplexing may be achieved at a UDP level and Channel multiplexing may be achieved at an IP level. When channel multiplexing is achieved at the UDP/IP level, a receiver may receive a UDP packet to find a desired channel and may find a channel using a port number. Further, after receiving an IP packet, the receiver may find a channel based on an IP address. Thus, the receiver should receive and analyze the UDP packet/IP packet to receive a desired channel. However, the above-described operation of the receiver increases time for which the receiver approaches a channel or a channel conversion time.

Thus, the embodiment of the present disclosure suggests that one channel correspond to GSEs.

Figure 4:
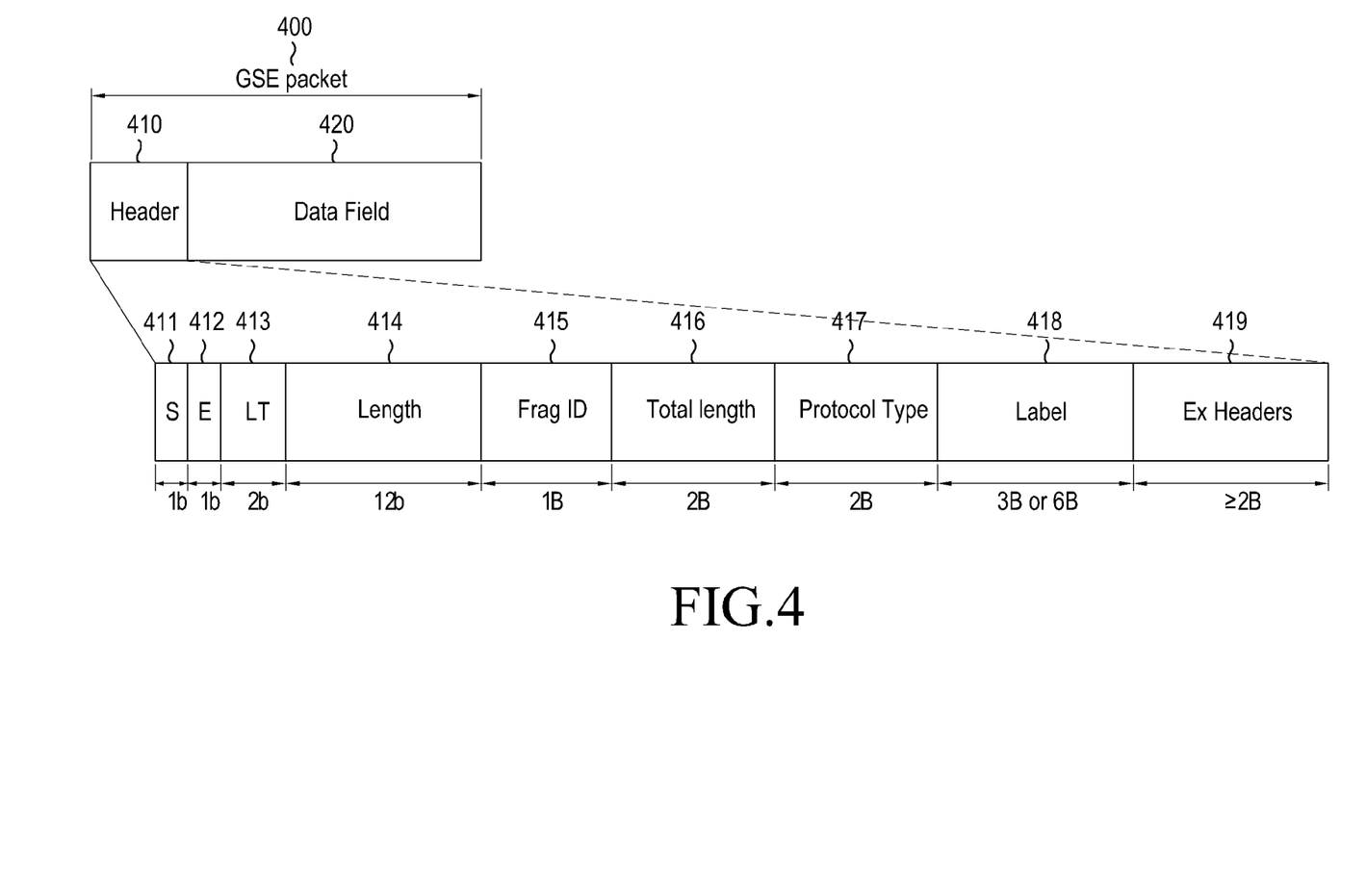
FIG. 4 is a view for explaining a structure of a DVB-Generic Stream Encapsulation (GSE) according to an embodiment of the present disclosure.

FIG. 4 is a view for explaining a structure of a DVB-GSE applied in the embodiment according to an embodiment of the present disclosure.

Referring to FIG. 4, the GSE packet 400 includes a header 410 for providing information necessary for processing the GSE packet 400, and a data field 420 for actually transmitting data. The header 410 includes fields including a Start Indicator (S) 411, an End Indicator (E) 412, a Label Type Indicator (LT) 413, a GSE packet length (Length) 414, a frag IDentifier (ID) 415, a total length 416, a protocol type 417, a label 418, and an Extension Header (Ex Header) 419.

Referring to FIG. 4, S 411 is a one-bit indicator, and when S 411 has a value of "1", it means that the GSE packet 400 transmits the first fragment of an upper level PDU. E 412 is a one-bit indicator, and when S 412 has a value of "1", it means that the GSE packet 400 transmits the final fragment of the upper level PDU. The GSE packet 400 transmitting an intermediate fragment of the upper level PDU has "0" and "0" as values of S 411 and E 412.

LT 413 is a 2 bit indicator, and informs of a type of a label 418 which is an address of a GSE layer used in the GSE packet 400. The label 418 is used when the receivers distinguish GSE packets which should be received by the receivers. When the LT 413 has a value of "00", it means that a label (an address in a GSE layer) having a 6 byte length is used, when the LT 413 has a value of "01", it means that a label of a 3 byte length is used, when the LT 413 has a value of "10", it means that a label is not used, and when the LT 413 has a value of "11", it means that a label is reused.

For example, the LT 413 of "11" prevents a waste of resources due to repeated transmission of the label 418, in which case the first GSE packet 400 of the BB frame through which the GSE packets are transmitted should definitely include a label 418 in the header 410 and repeated transmission of the label 418 can be prevented by using the value of "11" from the GSE packets.

The GSE packet 400 may be padded as the length of the upper level PDU is shorter than the length of the BB frame, and there may be notifications that padding data is transmitted through a combination of the values of S 411, E 412, and LT 413. When the values of the three indicators are all "0", it means that the data field 420 of the GSE packet 400 includes padding bits.

The field of length 414 has a length of 12 bits, a length of the GSE packet 400 from the first bit after the field of the length 414 of the GSE packet 400 to the final bit of the data field 420 or the final bit of the data field shortly before the padding bit is represented by a byte. The length field 414 may indicate a maximum of 4096 bytes.

The frag ID field 415 is used to identify the fragmented PDUs. That is, the PDUs fragmented from one PDU and transmitted to several GSE packets have the same identifier value.

The total length field 416 informs of a total length of the PDU transmitted through the GSE packets and has a length of 16 bits.

The protocol type field 417 indicates the presence of the protocol type 417 and the extension header 419 of the PDU transmitted through the data field 420 of the GSE packet 400 and has a length of 16 bits. Type 1 (0 to 1535) signifies the presence and type, and the PDU type of the extension header 419 and Type 2 (1536 to 65535) signifies the type of the PDU protocol.

The label field 418 is a field through which the value of the label is transmitted and has a length of 6 bites or 3 bites, and the extension header 419 is used to provide additional information other than the information provided by the header 410.

Figure 5:
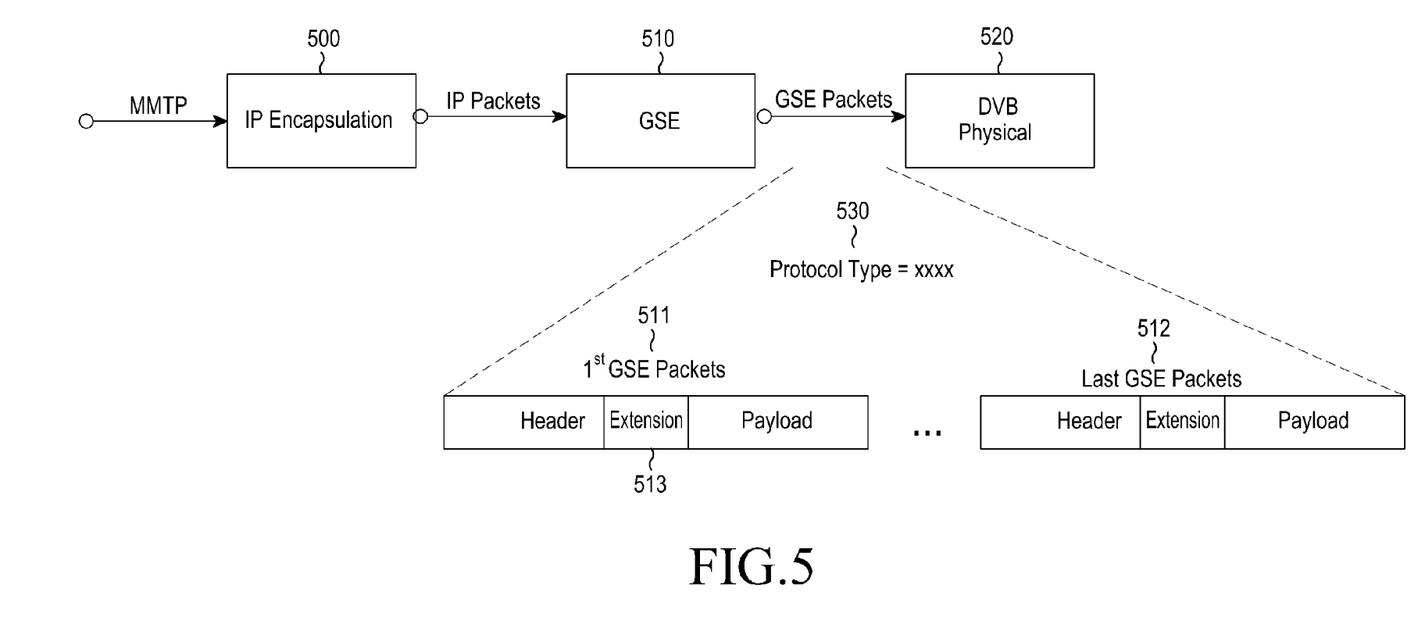
FIG. 5 is a view for explaining an example of transmitting an Internet Protocol (IP)/User Datagram Protocol (UDP) packet including an MMT packet using GSE, which is described with reference to FIG. 4, according to an embodiment of the present disclosure.

FIG. 5 is a view for explaining an example of transmitting an IP/UDP packet including an MMT packet using GSE, which is described with reference to FIG. 4, according to an embodiment of the present disclosure.

Referring to FIG. 5, after being encapsulated into a UDP datagram in the IP encapsulation 500, the MMT Packets (MMTPs) are configured into IP packets. The IP packets generated in the IP encapsulation 500 are input to the GSE unit 510 and include GSE packets 511 and 512. In a description of FIG. 5, the UDP/IP packet transmitting the MMTP is divided into a plurality of GSE packets to be transmitted. Two types of signaling are possible to inform the receiver that the MMTP or MMT package is transmitted through GSE.

The first method is to inform the receiver that the MMTP is transmitted by using the protocol type 417 (that is, reference numeral 530 of FIG. 5) of the GSE header 410. Either Type 1 or Type 2 is possible, and in the case of Type 2, a protocol type indicating IPv4-MMTP or a protocol type indicating IPv6-MMTP may be designated. When Type 1 is used, a protocol type indicating the two transmission types (IPv4-MMTP or IPv6-MMTP) and a protocol type indicating the presence of an extension header may be designated. A field by which information related to the MMTP may be transmitted is arbitrarily designated in the extension header 513, MMT package information transmitted through the broadcasting channel, for example, a broadcasting channel number is provided to the receiver through the field by which the information related to the MMTP may be transmitted to allow the receiver to promptly approach the channel. The GSE packets are input to the DVB physical layer 520 for transmission.

Figure 6:
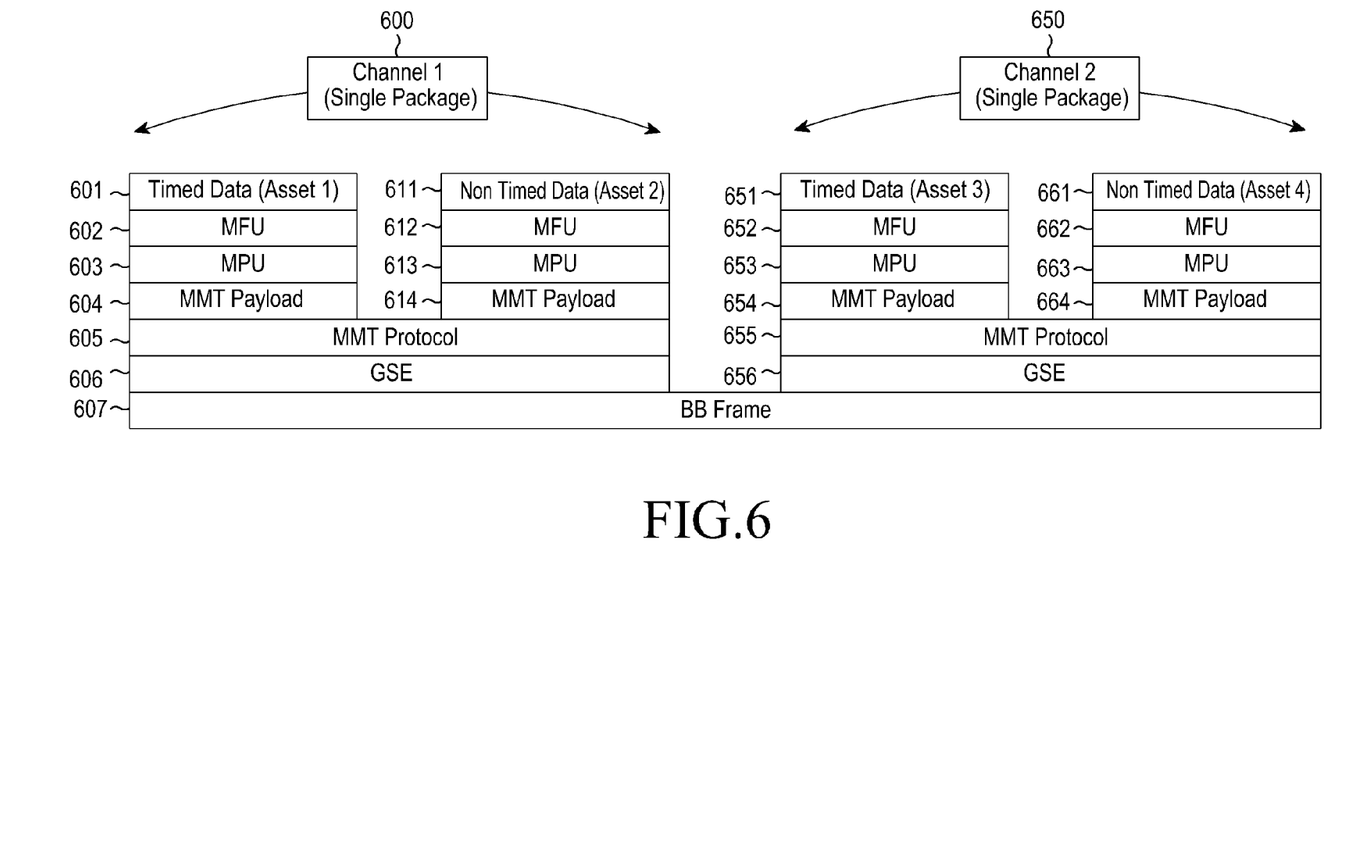
FIG. 6 is a view showing a protocol stack of a digital broadcasting system using MMT according to an embodiment of the present disclosure.

FIG. 6 is a view showing a protocol stack of a digital broadcasting system using MMT according to an embodiment of the present disclosure.

In addition, FIG. 6 shows an embodiment in which a UDP layer and an IP layer are not used, and a DVD system will be exemplified as the digital broadcasting system.

Referring to FIG. 6, it is assumed that the MMT package described with reference to FIG. 2 is transmitted through Channel 1 600 and Channel 2 650. It is assumed that Channel 1 600 includes timed data 601, for example, Asset 1 which is video data, and non-timed data 611 for providing additional information in a broadcasting service which transmits the video data, for example, Asset 2. Although audio data which is an element necessary for a broadcasting service is not shown in FIG. 6, it is assumed that the audio data may be transmitted through the same process as that of the video data.

Although video data and additional data are exemplified as the configuration of Channel 1 600 for convenience of description here, the next-generation broadcasting service may configure one channel with independent applications such as video data, audio data, captions, applications, webpages, additional data, games, and the like. The configuration of the channel may be modified according to a method of configuring a package in MMT.

The timed data 601 are created by the MFU 602, and the plurality of MFUs correspond to one MPU 603. Then, if the amount of data of the MFU 602 is large, the MPU 603 may be configured by the MFU 602. The MPU 603 is loaded on an MMT payload 604 for transmission. The size of the MMT payload 604 may be determined as a size which is most efficient to be used in a network through which the MMT payload 604 is to be transmitted. As an example, one MPU may correspond to one MMT payload, a plurality of MPUs may correspond to one MMT payload, or one MPU may correspond to a plurality of MMT payloads.

It is assumed that the MMT payload 604 is transmitted through a packet of the MMT protocol 605 and the MMT protocol 605 may transmit one MMT payload. The packet of the MMT protocol is configured into a DVB GSE packet 606 without undergoing a UDP layer and an IP layer, and is configured into a BB frame 607 of a physical layer. The BB frame 607 is transmitted to a receiver (e.g., a terminal of a user) via a physical layer processing step defined by the DVB. In FIG. 6, similar to that illustrated in FIG. 3, the non-timed data 611 of Channel 1 600 may be any service such as additional information or a webpage, and becomes an MMT payload 614 via the MFU 612 and the MPU 613. The MMT payload 614 is configured into a packet of the MMT protocol 605, is configured into a DVB GSE packet 606 without undergoing a UDP layer and an IP layer, and is transmitted to the BB frame 607 of a physical layer.

A difference between the embodiment of FIG. 6 and the embodiment of FIG. 3 is that the MMP packet is transmitted without undergoing a UDP layer and an IP layer in the embodiment of FIG. 6. That is, the embodiment of FIG. 6 may be applied to a case not using UDP/IP layers in consideration of a limit in a transmission speed of the transmission network or the characteristics of a ground wave broadcasting network corresponding to unidirectional transmission. In this way, since a Session Description Protocol (SDP) or a Real Time Streaming Protocol (RTSP) used for session information in a UDP/IP based transmission environment is not used when a UDP/IP layer is not used, the session information may be provided to the receiver by the MMT through signaling or the receiver may be informed of the session information by providing a separate signaling method.

The processing step of Channel 2 650 denoted by reference numerals 651 to 656 and 661 to 664 is the same as the processing step of Channel 1 600 denoted by reference numerals 601 to 606 and 611 to 614, respectively, and a detailed description thereof will be omitted.

Figure 7:
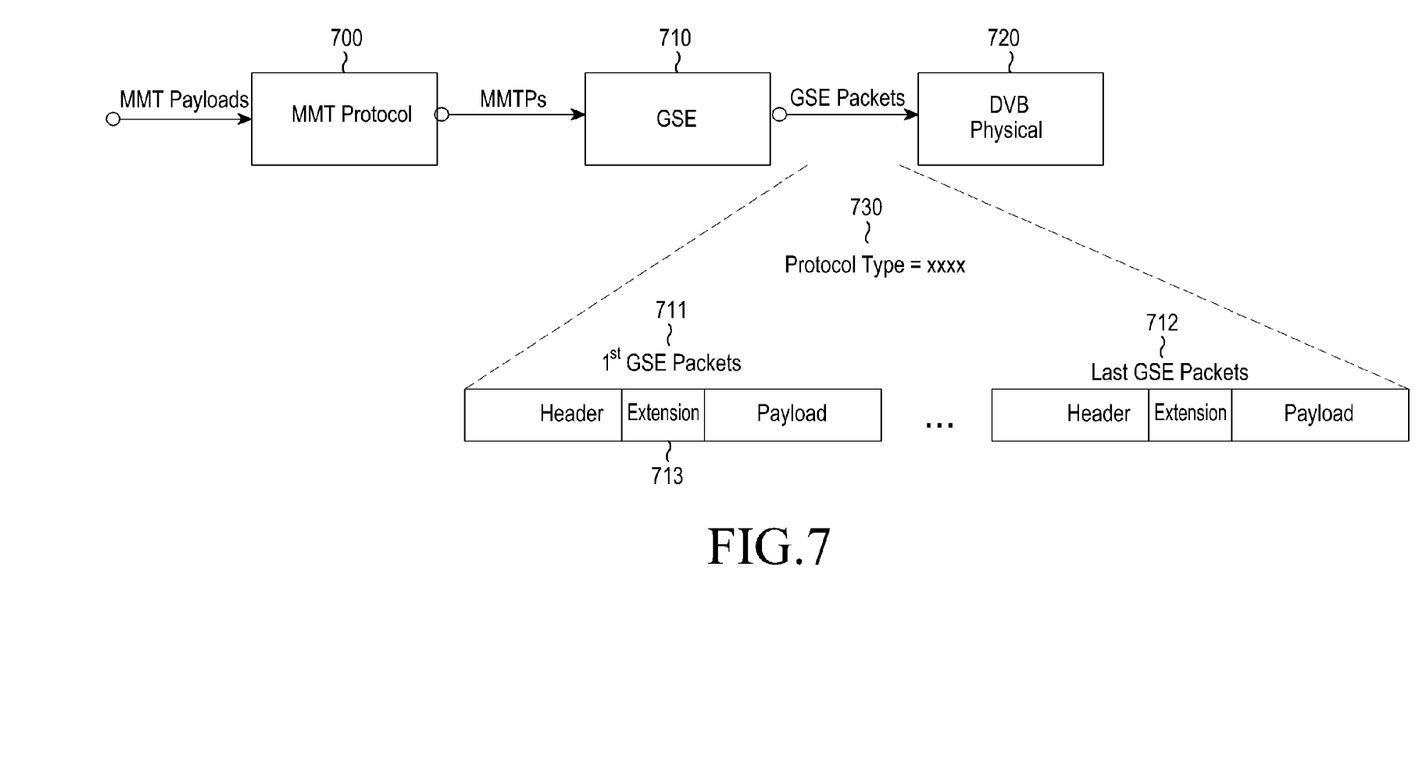
FIG. 7 is a view for explaining an example of transmitting an MMT packet using GSE, which is described with reference to FIG. 6, according to an another embodiment of the present disclosure.

FIG. 7 is a view for explaining an example of transmitting an MMT packet using GSE, which is described with reference to FIG. 6, according to an embodiment of the present disclosure.

Referring to FIG. 7, output from the MMT protocol 700, the MMTPs are input to the GSE unit 710 and include GSE packets 711 and 712. It is assumed in the description of FIG. 6 that the MMTP is divided into a plurality of GSE packets to be transmitted. Two types of signaling are possible to inform the receiver that the MMTP or MMT package is transmitted through GSE.

The first method is to inform the receiver that the MMTP is transmitted using the protocol type 417 (that is, reference numeral 730 of FIG. 7) of the GSE header 410. Type 1 or Type 2 may be used, and in the case of Type 2, an identifier indicating the MMTP may be added and in the case of Type 1, a protocol type indicating presence of the MMTP and the extension header 713 may be designated. A field by which information related to the MMTP may be transmitted is arbitrarily designated in the extension header 713, MMT package information transmitted through the broadcasting channel, for example, a broadcasting channel number is provided to the receiver through the field by which the information related to the MMTP may be transmitted to allow the receiver to promptly approach the channel. The GSE packets are input to the DVB physical layer 720 for transmission.

Further, as described in the embodiment of FIG. 6, the session information transmitted by the MMTP may be separately transmitted through the extension header 713. That is, a data rate, a buffer requirement of the MMT package may be transmitted through the extension header 713.

Figure 8:
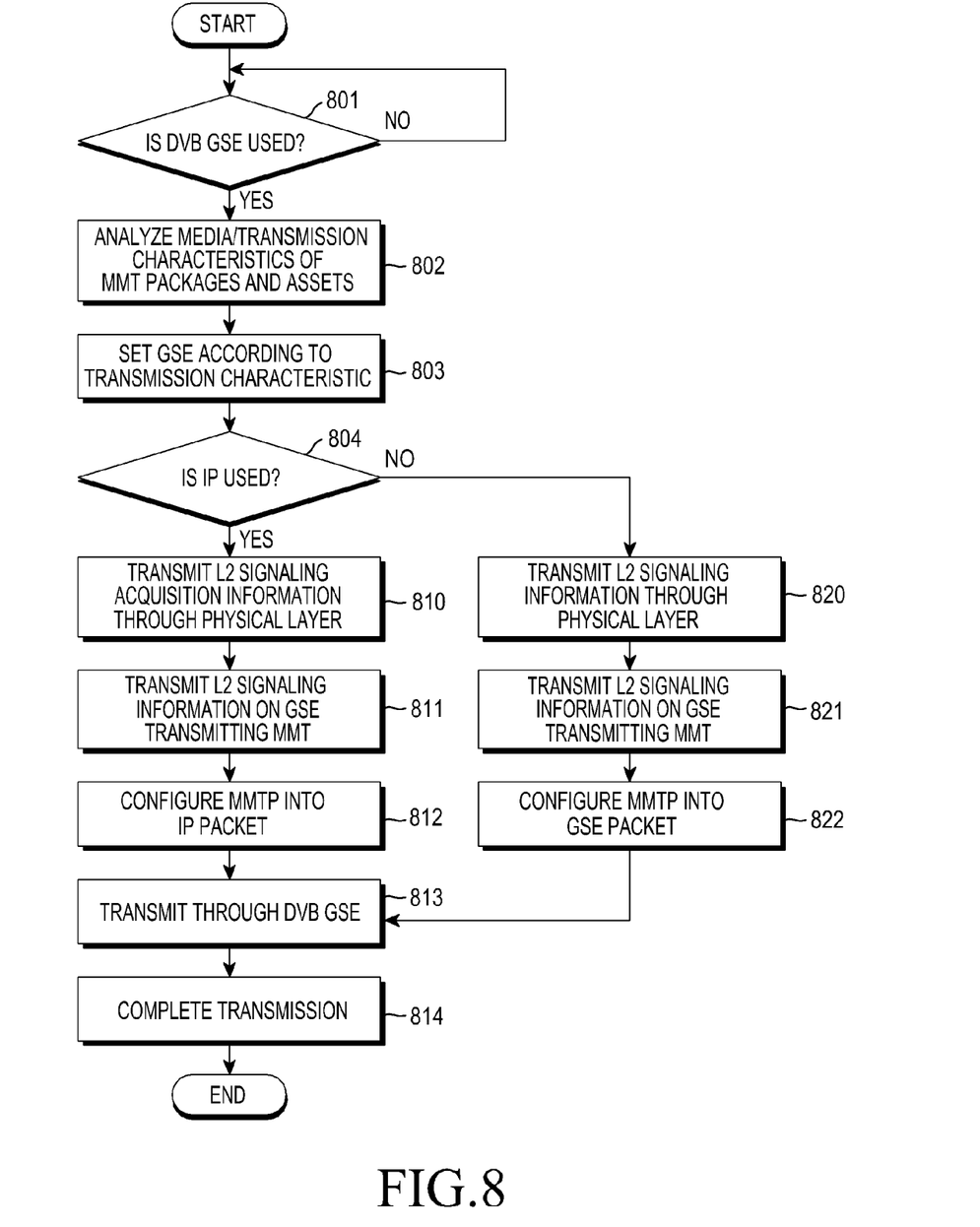
FIG. 8 is a flowchart showing operations of a transmitter of a digital broadcasting system using MMT according to an embodiment of the present disclosure.

FIG. 8 is a flowchart showing operations of a transmitter of a digital broadcasting system using MMT according to an embodiment of the present disclosure.

Although it has been described that the receiver in the embodiment of FIG. 8 may perform both the operations of the embodiment of FIG. 3 and the embodiment of FIG. 6, it is apparent that the receiver may be realized such that the operations of the embodiment of FIG. 3 and the embodiment of FIG. 6 may be performed separately or such that only one of the operations thereof is performed.

Referring FIG. 8, the transmitter determines whether the DVB-GSE is to be used when the MMT package is transmitted in operation 801, and operation 802 is performed when the DVB-GSE is used. If the DVB-GSE is not used, the transmitter proceeds to operation 801 to repeat the corresponding process or perform a predetermined operation.

In operation 802, the transmitter analyzes the media transmission characteristics of the MMT package or asset. Here, the media transmission characteristics may refer to an average transmission speed required during transmission, a maximum transmission speed, a minimum transmission speed, and a unit transmission size for efficient transmission. In operation 802, after the analyzing of the MMT package and the asset, the transmitter proceeds to operation 803 to set GSE according to the media transmission characteristics. The setting of the GSE may include setting the size of a GSE packet and use of a fragmentation.

In operation 804, the transmitter determines whether an IP is to be used, and when the IP is used, the transmitter proceeds to operation 810. However, when the IP is not used, the transmitter proceeds to operation 820.

In operation 810, Layer 2 (L2) signaling acquisition information (for example, L2 channel approach information) is transmitted to a physical layer according to the standard of DVB. The physical layer is a default physical layer and may correspond to a channel which may be reached by all receivers without separate signaling. The L2 channel approach information is information on the L2 layer of the DVB, and is information which may approach the L2 layer transmitted through the physical layer.

In operation 811, the transmitter proceeds to operation 812 after transmitting L2 signaling information on the GSE transmitting the MMT to configure the MMTP into an IP packet according to the method described in the embodiment of FIG. 5. In operations 813 and 814, the transmitter transmits the configured IP packet by using DVB GSE to completely transmit the MMT package or asset.

Meanwhile, when the IP is not used in operation 804, the transmitter transmits L2 signaling information (L2 channel approach information) to the physical layer according to the standard of DVB in operation 820. The physical layer is a default physical layer and may correspond to a channel which can be reached by all receivers without separate signaling. The L2 channel information is information on the L2 layer of the DVB, and is information which may approach the L2 layer transmitted through the physical layer.

In operation 821, the transmitter proceeds to operation 822 after transmitting L2 signaling information on the GSE transmitting the MMT to configure the MMTP into an IP packet according to the method described in the embodiment of FIG. 7, and then proceeds to operation 813. In operation 813, the transmitter transmits the configured GSE packet by using the DVB GSE.

Figure 9:
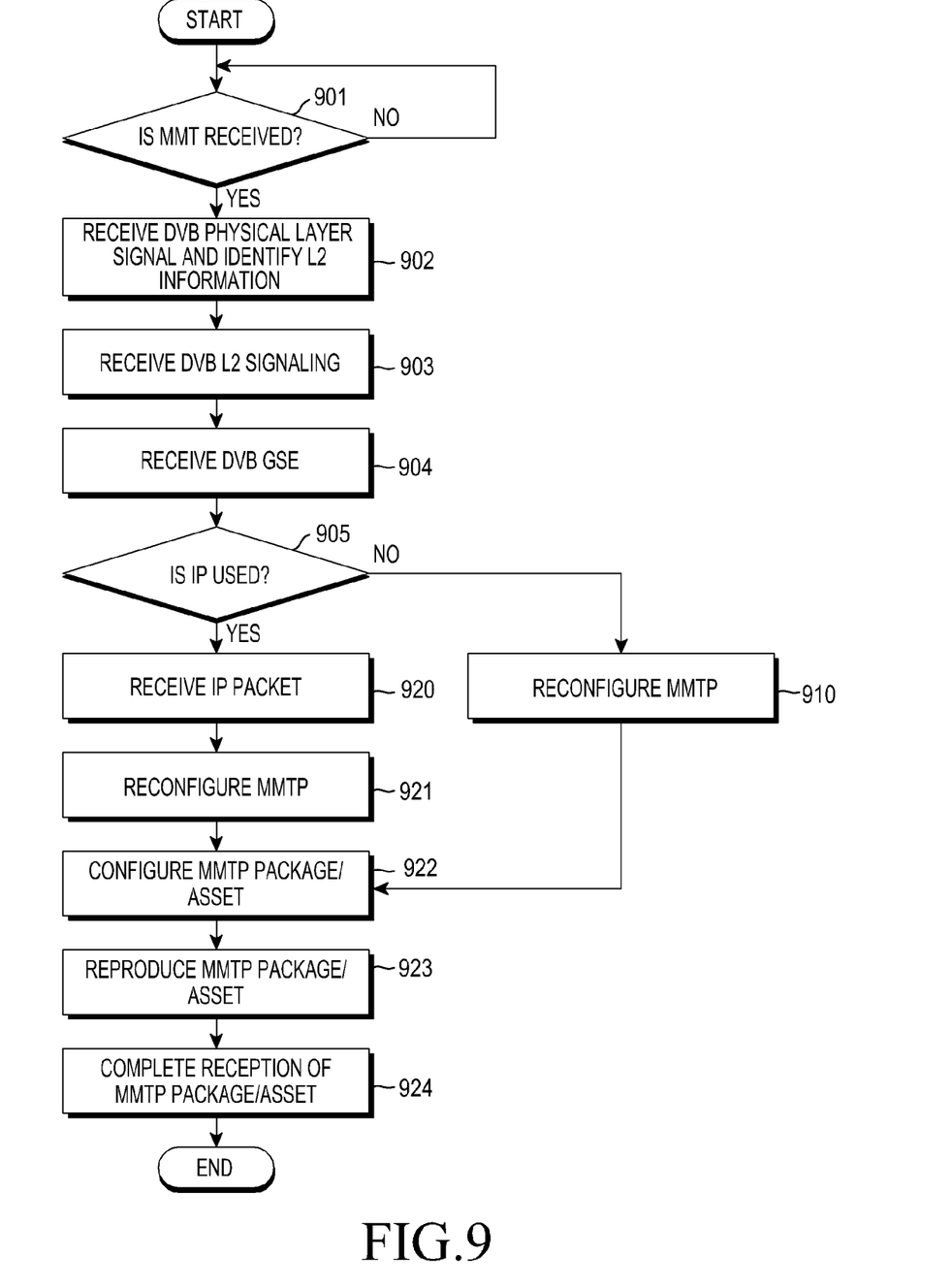
FIG. 9 is a flowchart showing operations of a receiver of a digital broadcasting system using MMT according to an embodiment of the present disclosure.

FIG. 9 is a flowchart showing operations of a receiver of a digital broadcasting system using MMT according to an embodiment of the present disclosure.

Although it has been described that the transmitter in the embodiment of FIG. 9 may perform both the operations of the embodiment of FIG. 3 and the embodiment of FIG. 6, it is apparent that the transmitter may be realized such that the operations of the embodiment of FIG. 3 and the embodiment of FIG. 6 may be performed separately or such that only one of the operations thereof is performed.

Referring to FIG. 9, in operation 901, the receiver determines whether an MMT is to be received according to an instruction of the user or a rule made in advance, and when the MMT is received, the receiver proceeds to operation 902. If the MMT is not received, the receiver proceeds to operation 901 to repeat the corresponding process.

After acquiring L2 signaling approach information by receiving a DVB physical layer signal in operation 902, the receiver proceeds to operation 903 to receive L2 signaling information. In operation 904, the receiver receives the DVB-GSE (that is, a GSE packet) and proceeds to operation 905 to determine whether the IP is used in the GSE packet. Here, the information on whether the IP is used may be identified through the GSE header or the extension header of the GSE packet after acquiring the GSE packet in operation 903 or receiving the GSE packet in operation 904. When the IP is used in the GSE packet in operation 905, the receiver proceeds to operation 920, but when the IP is not used, the receiver proceeds to operation 910 to reconfigure the MMTP and then proceeds to operation 922.

When the IP is used in operation 905, the receiver configures the IP packet from the GSE packet received in operation 920 and proceeds to operation 921 to reconfigure the MMTP from the IP packet. The receiver configures the MMT package/asset by using the reconfigured MMTP in operation 922, reproduces the MMT package/asset in operation 923, and proceeds to operation 924 to complete an MMT package/asset receiving operation.

Figure 10:
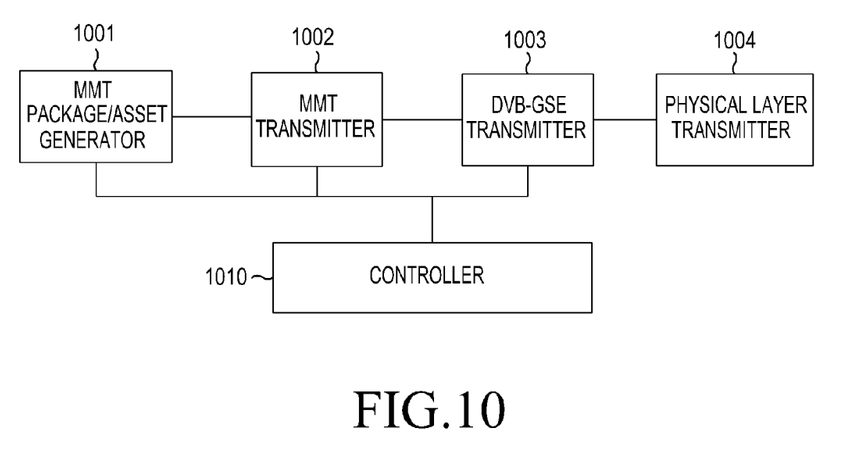
FIG. 10 is a block diagram showing operations of a transmitter of a digital broadcasting system using MMT according to an embodiment of the present disclosure.

FIG. 10 is a block diagram showing an operation of a transmitter of a digital broadcasting system using MMT according to an embodiment of the present disclosure.

Referring to FIG. 10, the MMT transmitter includes an MMT package/asset generator 1001, an MMT transmitter 1002, a DVB-GSE transmitter 1003, a physical layer transmitter 1004, and a controller 1010.

The MMT package/asset generator 1001 generates an MMT package or asset according to a method defined by the MMT standard and generates related information. The MMT transmitter 1002 generates an MMTP/UDP/IP packet or an MMTP packet which is to be transmitted to the DVB-GSE transmitter 1003 according to a method defined by the MMT standard and a method suggested in the embodiment of the present disclosure. The DVB-GSE transmitter 1003 transmits a GSE packet through which the MMTP is to be transmitted according to the method described in the embodiments of FIGS. 3 to 9 and related signaling information, and the physical layer transmitter 1004 is responsible for an operation of a physical layer which transmits the GSE packet generated by the DVB-GSE transmitter 1003 according to a method defined by the DVB standard.

The controller 1010 controls the MMT package/asset generator 1001, the MMT transmitter 1002, and the DVB-GSE transmitter 1003 according to the method described in the embodiments of FIGS. 3 to 9 to control an overall operation of the transmitter which transmits the MMT packet by using the DVB-GSE.

Although not illustrated, the transmitter may be implemented with a controller and a transmission unit. The controller may analyze a media transmission characteristic of a MMT package, to set DVB GSE based on the analyzed media transmission characteristic, and to transmit an MMT packet comprising the broadcasting data constituting the MMT package by using the DVB GSE according to the methods described in the embodiments of FIGS. 3 to 9. The transmission unit may transmit the broadcasting data through a network.

Furthermore, the controller may control an operation of configuring the MMT packet into an IP packet when an IP is used, and the configured IP packet is transmitted through the DVB GSE. The controller may control an operation of transmitting signaling information on the DVB GSE through a physical layer. The controller may control an operation of configuring the MMT packet into a GSE packet, and the GSE packet comprises an extension header comprising information on the MMT packet.

Figure 11:
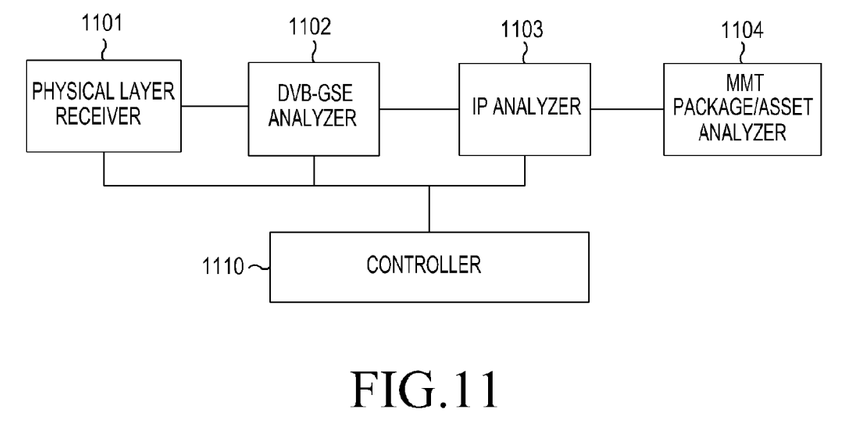
FIG. 11 is a block diagram showing operations of a receiver of a digital broadcasting system using MMT according to an embodiment of the present disclosure.

FIG. 11 is a block diagram showing operations of the receiver of the digital broadcasting system using MMT according to the embodiment of the present disclosure.

Referring to FIG. 11, the MMT receiver includes a physical layer receiver 1101, a DVB-GSE analyzer 1102, an IP analyzer 1103, an MMT package/asset analyzer 1104, and a controller 1110.

The physical layer receiver 1101 is responsible for an operation of receiving and processing a DVB physical channel, and the DVB GSE analyzer 1102 analyzes the DVB-GSE (that is, the GSE packet) output from the physical layer receiver 1101 to configure an IP packet or reconfigure an MMTP from the GSE packet. The IP analyzer 1103 reconfigures and outputs an IP packet and a UDP datagram when the embodiment of FIG. 3 is used. The MMT package/asset analyzer 1104 extracts broadcasting data from the input MMTP and reconfigures an MMT package and an asset. The control unit 1110 controls the physical layer receiver 1101, the GSE analyzer 1102, and the IP analyzer 1103 according to the methods described in the embodiments of FIGS. 3 to 9 to control an overall operation of the receiver which receives the MMT by using the DVB-GSE.

Although not illustrated, the receiver may be implemented with a controller and a reception unit. The controller may control operations of receiving a GSE packet received using DVB GSE, reconfiguring a MMT packet from the GSE packet, and extracting the broadcasting data from the MMT packet and reconfigure an MMT package according to the methods described in the embodiments of FIGS. 3 to 9. The reception unit may receive the broadcasting data through a network.

Furthermore, the controller may the controller may control an operation of reconfiguring the GSE packet into an IP packet when an IP is used and reconfiguring the MMT packet from the IP packet. The controller may control an operation of receiving signaling information on the DVB GSE through a physical layer.

Although various embodiments have been described in the detailed description of the present disclosure, the present disclosure may be modified in various forms without departing from the scope of the present disclosure. Therefore, the scope of the present disclosure is not limited to the embodiment described above, and should be defined by the accompanying claims and the equivalents of the claims.

It will be appreciated that the apparatus and method for transmitting and receiving a broadcasting service according to the embodiments of the present disclosure may be realized in the form of hardware, software, and a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. A web widget manufacturing method of the present disclosure can be realized by a computer or a portable terminal including a controller and a memory, and it can be seen that the memory corresponds to an example of the storage medium which is suitable for storing a program or programs including instructions by which the embodiments of the present disclosure are realized, and is machine readable.

Accordingly, the present disclosure includes a program including a code for implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

Further, an apparatus for transmitting and receiving a broadcasting service according to an embodiment of the present disclosure may receive and store the program from a program providing unit connected wiredly and wirelessly. The program supply apparatus may include a program that includes instructions to execute certain embodiments of the present disclosure, a memory that stores information or the like required for certain embodiments of the present disclosure, a communication unit that conducts wired or wireless communication with the electronic apparatus, and a control unit that transmits a corresponding program to a transmission/reception apparatus in response to the request from the electronic apparatus or automatically.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting media data in a digital broadcasting system, the method comprising:
    generating media data constituting a moving picture experts group (MPEG) media transport MMT package used in a MMT system;
    configuring at least one first packet including the media data into at least one second packet processed in a digital video broadcasting (DVB) system; and
    transmitting the at least one second packet in the DVB system.

2. The method of claim 1, further comprising determining whether to transmit a data packet processed in the MMT system by using a data packet processed in the DVB system.

3. The method of claim 1, wherein each of the at least one second packet comprises a header information including information indicating transmission of a MMT packet.

4. The method of claim 3, wherein the header information further comprises information for reception of the MMT package at a terminal.

5. The method of claim 1, wherein the first packet is a MMT packet, and the second packet is a generic stream encapsulation (GSE) packet.

* * * * *